United States Patent
Frankel et al.

(10) Patent No.: US 6,811,148 B2
(45) Date of Patent: Nov. 2, 2004

(54) QUICK-CONNECT DIFFUSER ASSEMBLY

(75) Inventors: Thomas Frankel, Poughkeepsie, NY (US); Seoung-il Kang, Poughkeepsie, NY (US); Todd Ritter, Poughkeepsie, NY (US)

(73) Assignee: Stamford Scientific Int'l, Inc., Poughkeepsie, NY (US)

( * ) Notice: Subject to any disclaimer, the term of this patent is extended or adjusted under 35 U.S.C. 154(b) by 10 days.

(21) Appl. No.: 10/249,667

(22) Filed: Apr. 29, 2003

(65) Prior Publication Data

US 2003/0192817 A1 Oct. 16, 2003

(51) Int. Cl.⁷ .................................................. B01F 3/04
(52) U.S. Cl. ........................... 261/122.1; 261/DIG. 70; 285/197
(58) Field of Search ........................... 261/122.1, 122.2, 261/DIG. 47, DIG. 70; 285/197, 419, 420, 421; 210/220

(56) References Cited

U.S. PATENT DOCUMENTS

| | | | | |
|---|---|---|---|---|
| 3,837,629 A | * | 9/1974 | Matras et al. ............. | 261/122.1 |
| 4,960,546 A | * | 10/1990 | Tharp ....................... | 261/122.1 |
| 5,846,412 A | * | 12/1998 | Tharp ....................... | 210/220 |
| 6,244,574 B1 | * | 6/2001 | Downs ..................... | 261/122.1 |
| 6,464,211 B1 | * | 10/2002 | Downs ..................... | 261/122.1 |
| 6,497,402 B2 | * | 12/2002 | Tharp ....................... | 261/122.1 |
| 6,511,055 B2 | * | 1/2003 | Jager ........................ | 261/122.1 |
| 6,702,263 B2 | * | 3/2004 | Kelly ........................ | 261/122.1 |
| 2002/0149123 A1 | * | 10/2002 | Edel et al. ................ | 261/122.1 |

* cited by examiner

*Primary Examiner*—Scott Bushey (57) ABSTRACT

The Quick Connect Diffuser Assembly of the present invention includes a special saddle in fluid communication with an air distribution header pipe and a diffuser body connected to the special saddle. The saddle is connected to the air distribution header pipe with a two interlocking sections joined on one side with a hinge, and on the other with flanges. The flanges are connected with a wedge piece. The diffuser connects to the upper saddle section with a bayonet type Quick connection. Gas is forced from the air distribution header pipe through an orifice hole in the pipe, then through the saddle and exits the diffuser body through a diffusion membrane. The membrane forms the gas into fine bubbles that aerate liquid contained in a basin. A single saddle assembly is adaptable to mount on either US or Metric pipe, which have different outside diameters, by changing gaskets and an O-ring.

7 Claims, 14 Drawing Sheets

QUICK-CONNECT DIFFUSER ASSEMBLY

BACKGROUND OF INVENTION

This invention relates to an improvement in a diffuser assembly for use in the aeration of liquids, more particularly sewage waste water and industrial waste water.

Diffused aeration systems supply oxygen to waste water, and keep solids in suspension with gentle mixing. Diffusing ambient air into waste water from municipal sources or from commercial or industrial installations facilitates the growth of particular bacteria. These bacteria then produce beneficial enzymes.

A piping network which may be bolted to the basin floor or weighted with ballast to prevent buoyancy from carrying the pipe to the water's surface. The piping network consists of a vertical drop pipe, typically metal, a manifold, either plastic or metal, and a plurality of air distribution headers.

Conventional diffusers are connected to the distribution headers with glue-on, clamp-on, screw-on saddles, or are screwed into female sockets or grommets. Each of these methods of connecting diffusers to pipe are time consuming.

Glue-on diffusers consist of 4 parts—a PVC base piece solvent welded onto an air distribution header, a backer plate, a membrane and a retaining ring. Typically the installing contractor must attach the backer plate, membrane and retaining ring at the jobsite. This is time consuming and inconvenient, particularly in bad weather. Furthermore it is difficult for the contractor or end user add or subtract diffuser assemblies on a single air distribution header pipe. Furthermore, such diffusers become brittle in cold weather since they are made of PVC. Reference U.S. Pat. No. 4,288,394.

Threaded diffusers which screw into grommets or female sockets must rely typically on ¾" threads alone to resist the force of buoyancy and pressurized air originating in the air distribution header. In basins with water velocity caused by mechanical mixers or rapid influent streams, a ¾" threaded connection does not offer sufficient resistance to that force. Reference U.S. Pat. No. 5,762,835.

Clamp-on diffusers are currently available in the market with wedge connectors. U.S. Pat. Nos. 6,497,402 and D,386,243 refer to clamp-on diffusers. Neither design allows the installer to completely remove the diffuser from the saddle, while leaving the saddle intact and installed on pipe. In conventional clamp-on designs, the saddle forms an integral part of the diffuser body. With such designs, it is not possible to replace the diffuser body without replacing the saddle assembly.

DETAILED DESCRIPTION

The present invention relates to a system for aerating and/or mixing sewage, industrial wastewater, or related liquids contained within a basin which may be referred to as a tank, lagoon or channel. The basin is typically a concrete, steel or earthen structure.

An air blower or compressor supplies air to the invention through a network of steel and/or plastic pipes and fittings. Such pipes include out-of tank air supply pipes, vertical drop pipes into the tank(s), manifold pipes installed on or near the basin floor, and header pipes 3, which are installed perpendicularly to the manifold pipes. The header pipes 3 may be constructed of polyvinyl chloride, however they may be stainless steel, galvanized steel or other plastic material such as polypropylene, ABS or another plastic. The header pipes 3 are typically 4" nominal diameter, however they may be from 2" to 8" in diameter.

Figure 2:
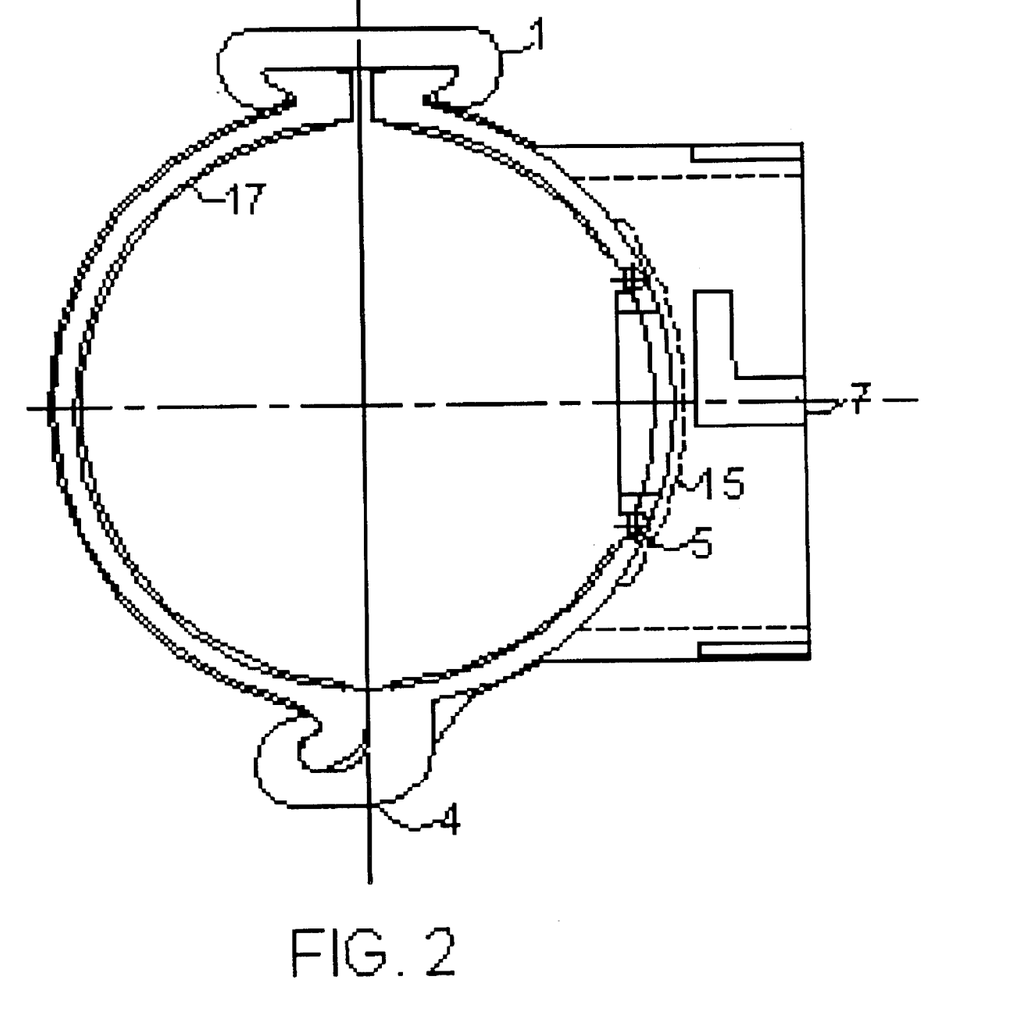
FIG. 2 is is a section view of the Saddle components of the Disc type Quick Connect Diffuser Assembly.
Figure 3:
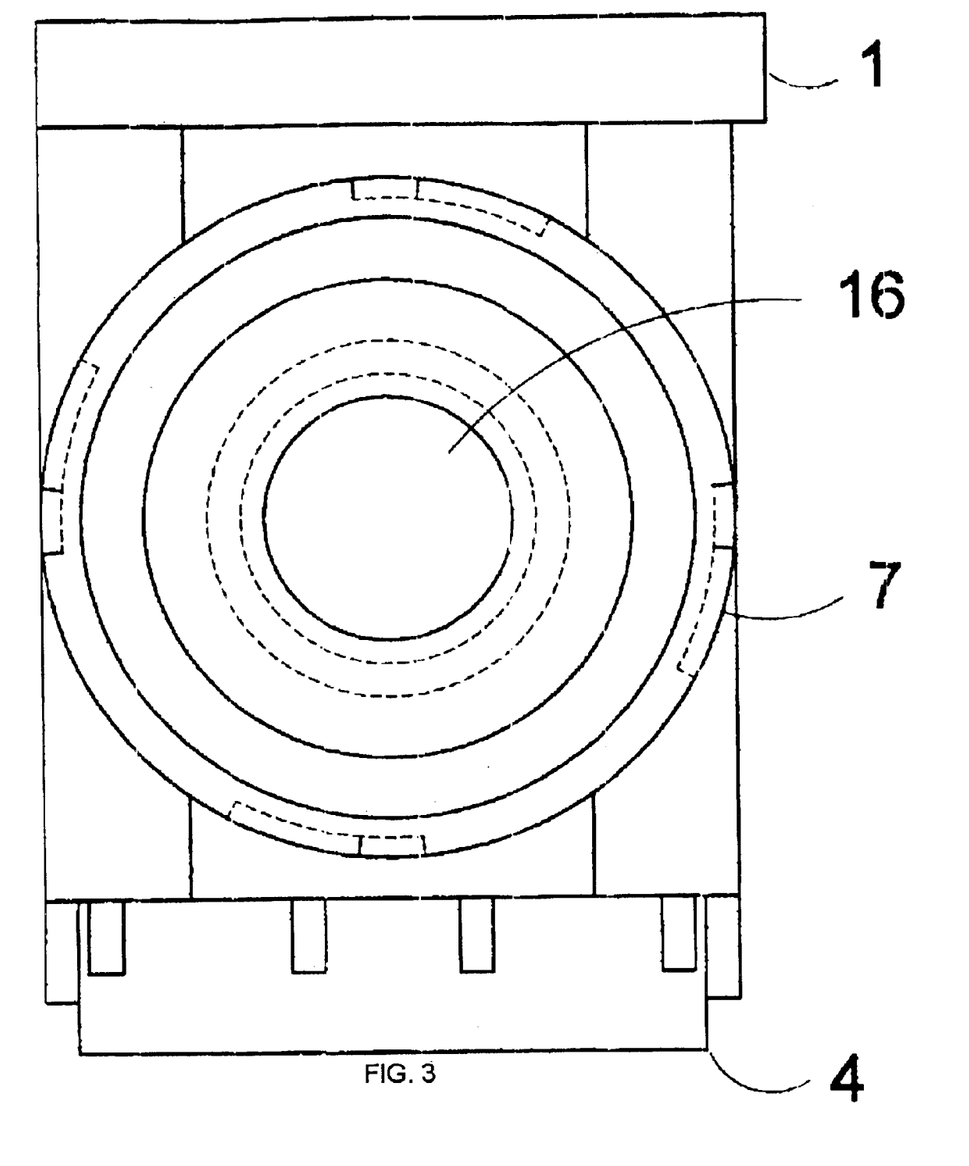
FIG. 3 is a plan view of the Upper Saddle section with the bayonet fitting for disc or tube diffusers.
Figure 4:
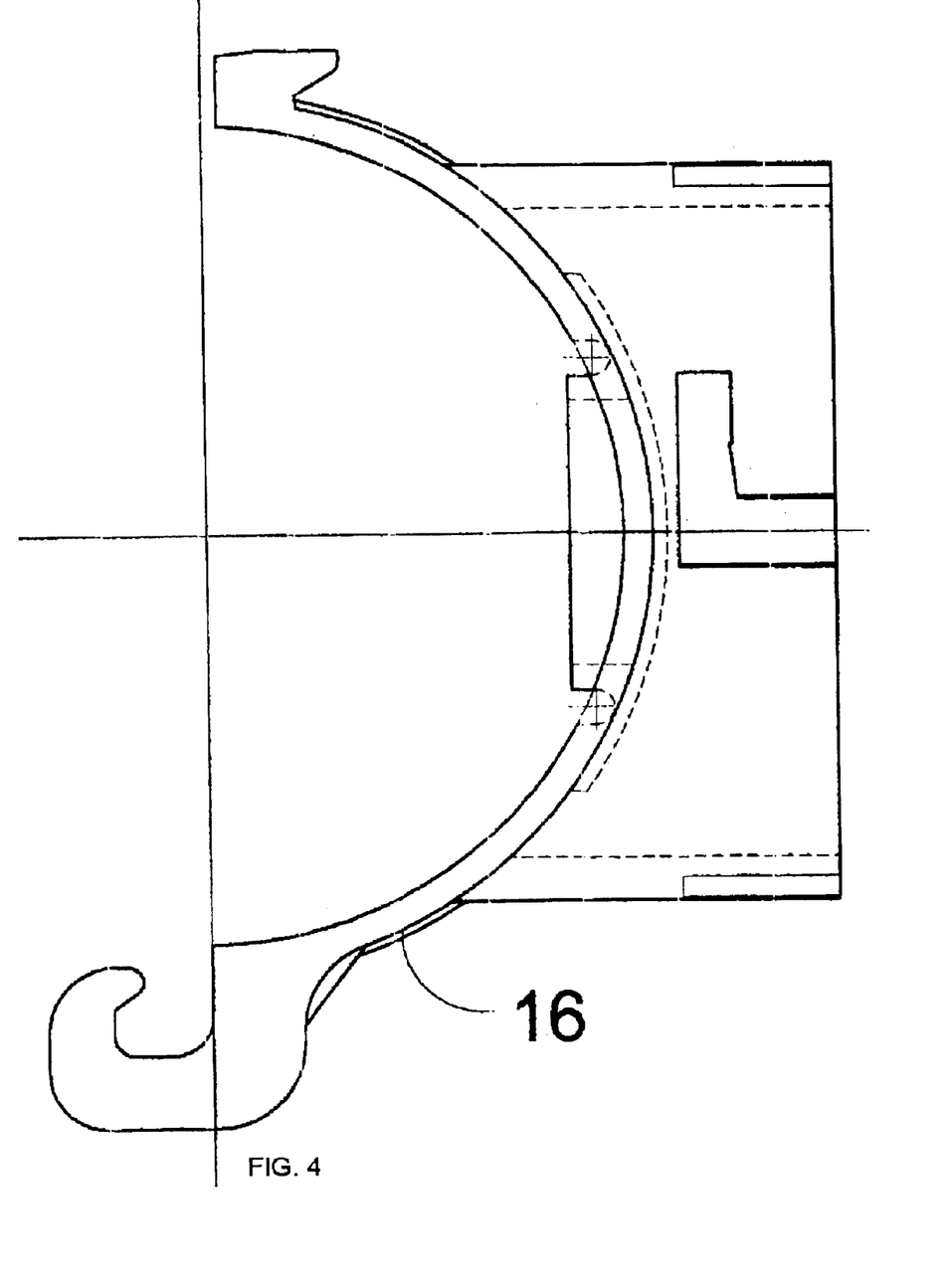
FIG. 4 is a section view of the Upper Saddle section with the bayonet fitting for disc or tube diffusers.
Figure 5:
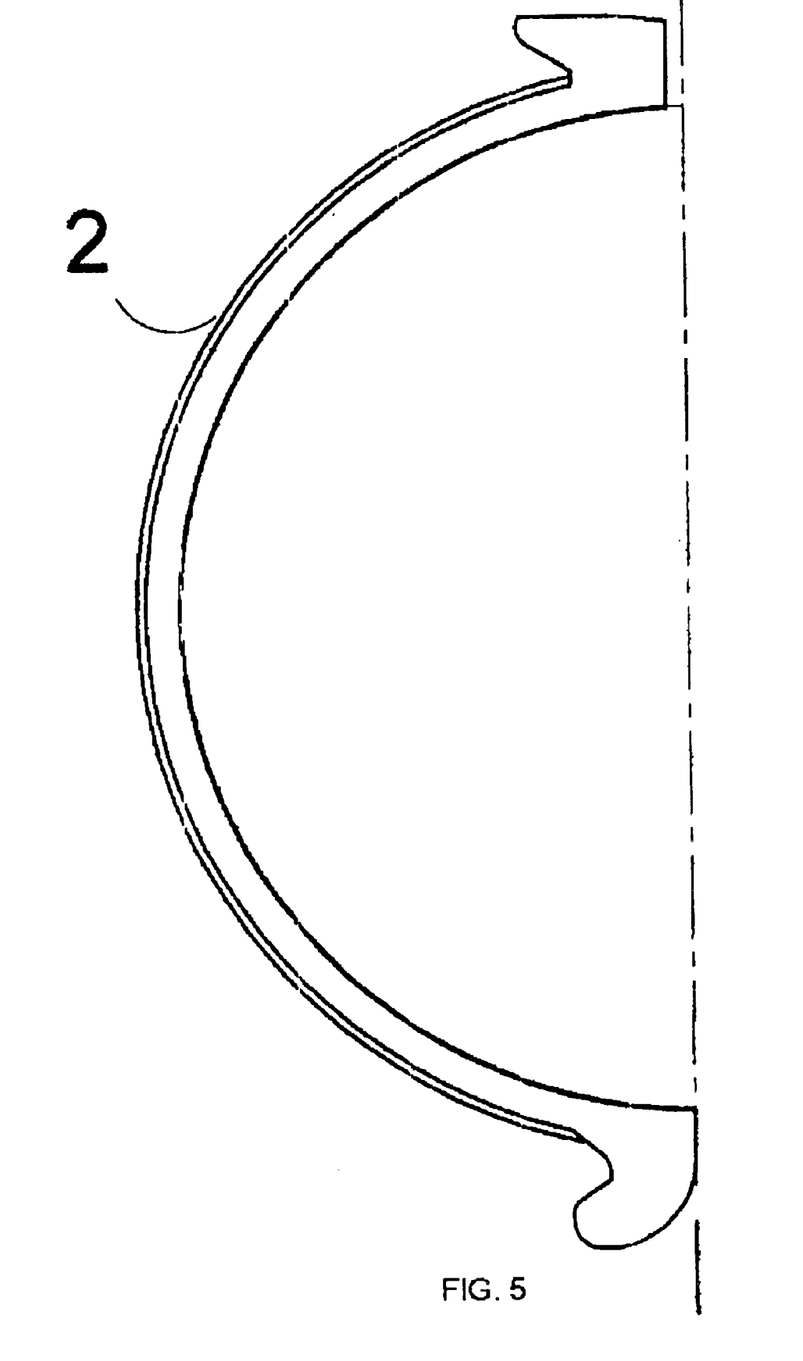
FIG. 5 is a section view of the Lower Saddle section for disc diffusers.
Figure 6:
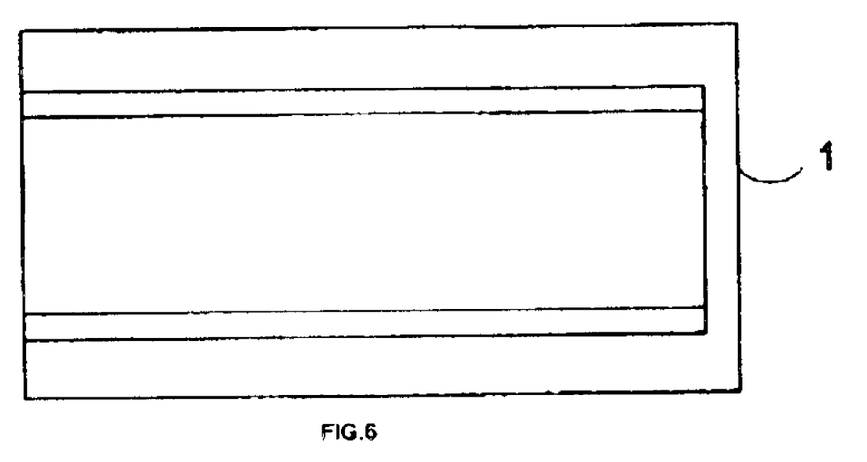
FIG. 6 is a plan view of the tapered saddle wedge for disc or tube diffusers.
Figure 7:
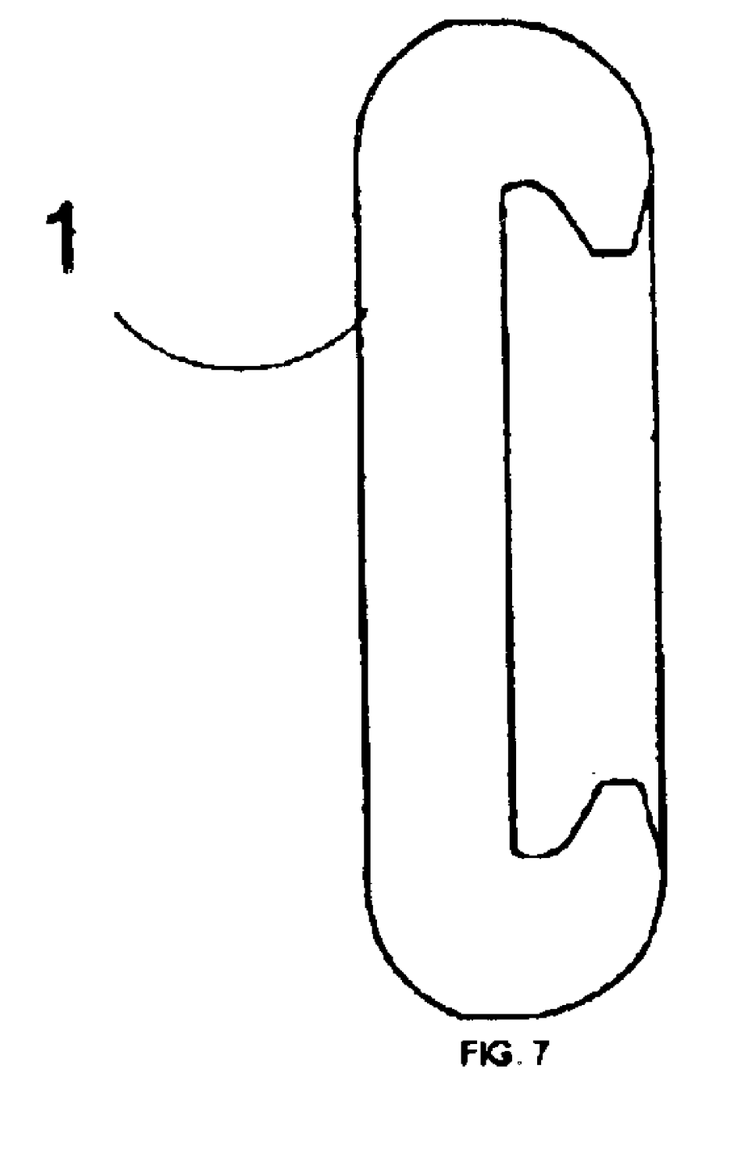
FIG. 7 is a section view of the tapered saddle wedge for disc or tube diffusers.

In accordance with the present invention, a plurality of air diffusers 8 are connected with the header pipes 3 with a special bayonet mounting saddle shown in FIG. 2.

Figure 1:
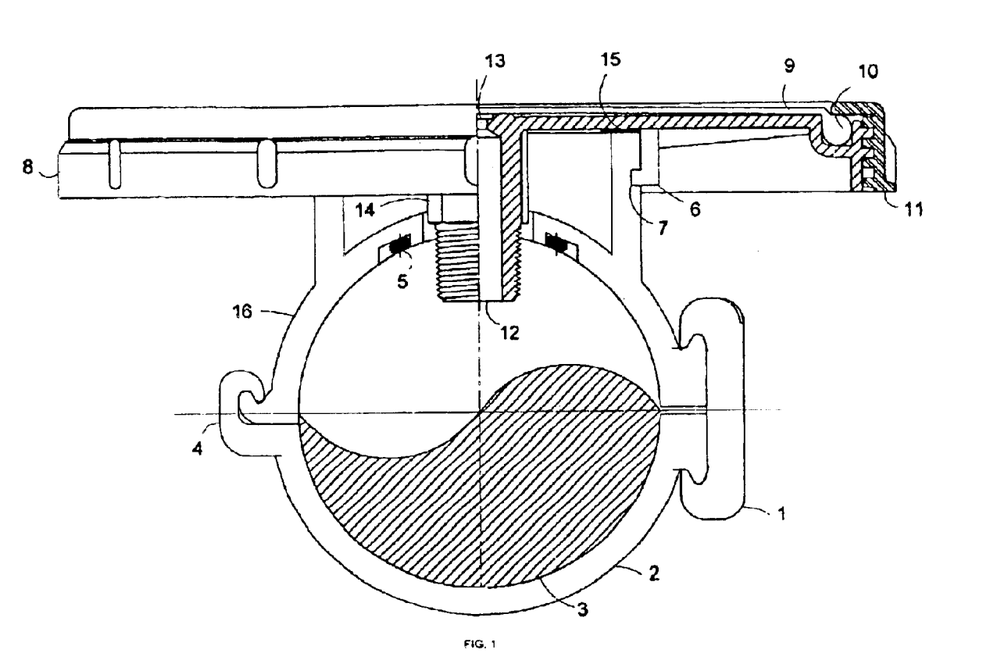
FIG. 1 is a section view of a complete Disc type Quick Connect Diffuser Assembly with mounted on pipe.

With particular reference to FIG. 1, the special mounting saddle consists of two complimentary saddle sections 2 and 16. Each section, lower 2 and upper 16 is semi-cylindrical and have a size and shape to tightly enclose the cylindrical external dimension of the header pipe 3. The two saddle sections fasten tightly together with a hinge 4 and a special wedge 1.

Figure 8:
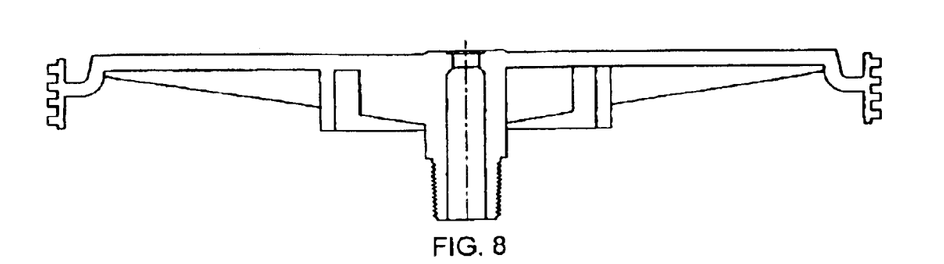
FIG. 8 is a section view of the Diffuser Base with bayonet fitting.

Air diffusers 8 are connected to the special saddle FIG. 2 with a bayonet style connection. Saddle section 16 shows an female fitting 7 integrally molded to the upper saddle 16 connecting with a male section 6 integrally molded to the Air Diffuser base FIG. 8. An O-ring seal 5 is used to prevent air leakage between the Air Diffuser base FIG. 8 and the Upper saddle section 16 and to apply force.

Figure 9:
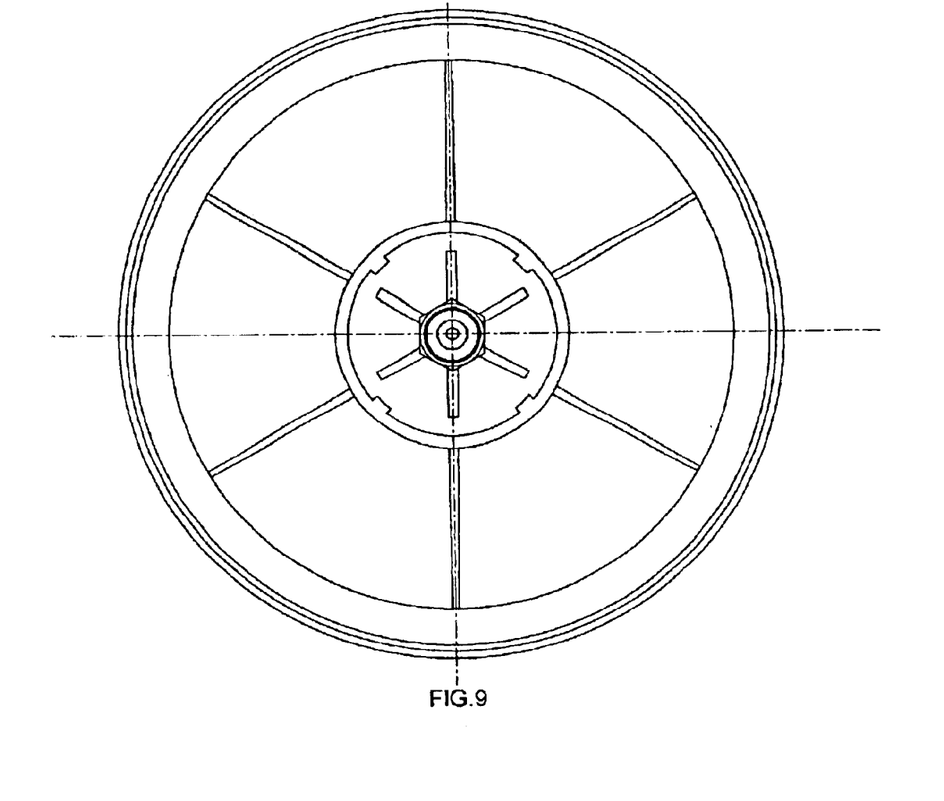
FIG. 9 is a plan view of the Diffuser Base with bayonet fitting.
Figure 10:
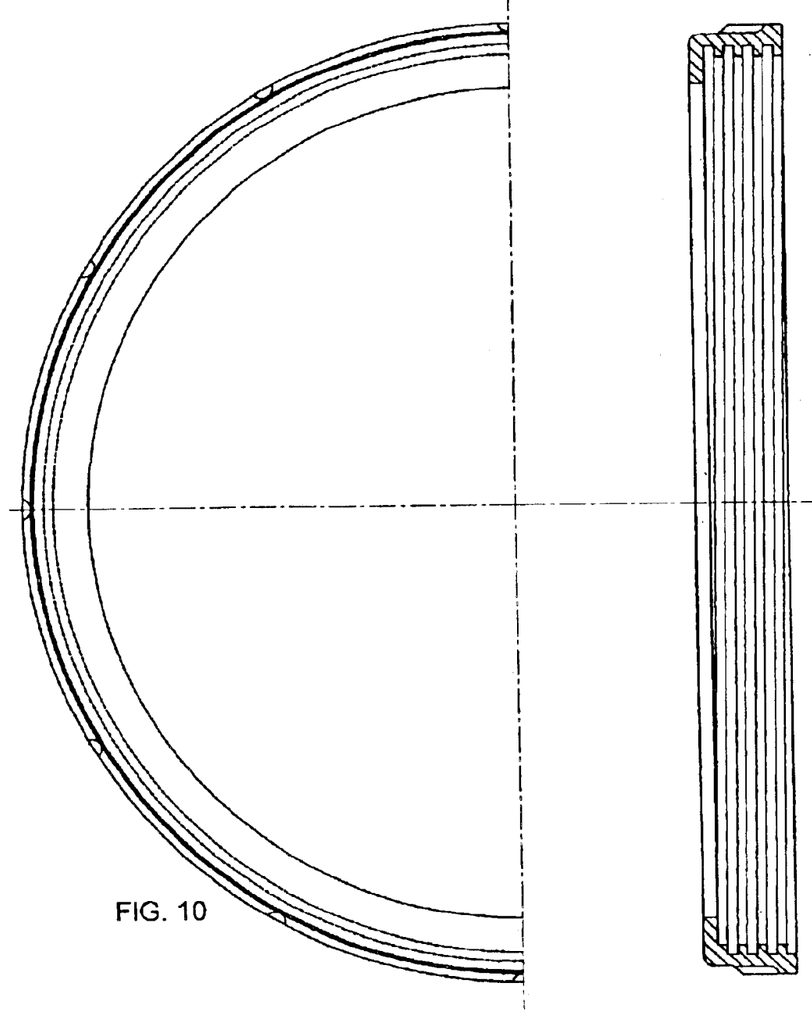
FIG. 10 is a section view of the Diffuser Retaining Ring.
Figure 11:
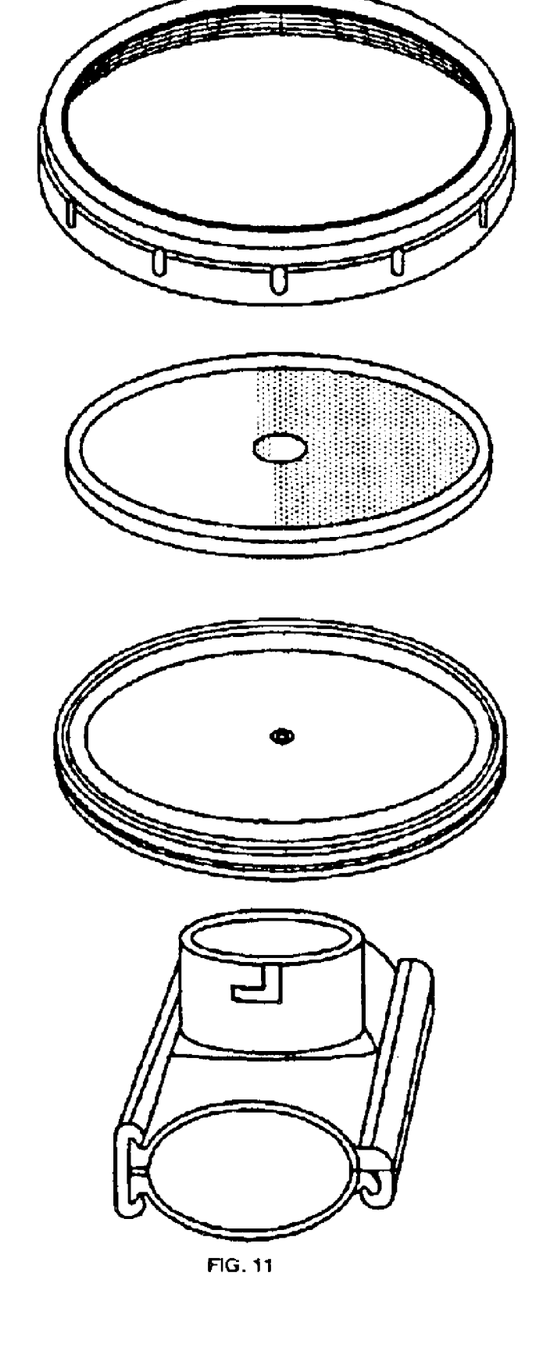
FIG. 11 is an exploded view of the complete Quick Connect Diffuser Assembly for disc diffusers.
Figure 12:
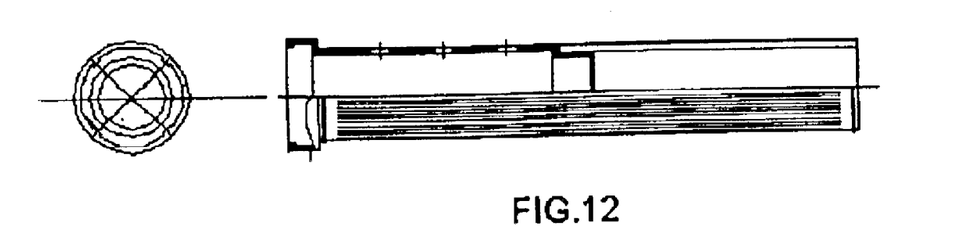
FIG. 12 is a plan view of a Tube type Quick Connect Diffuser Assembly.
Figure 13:
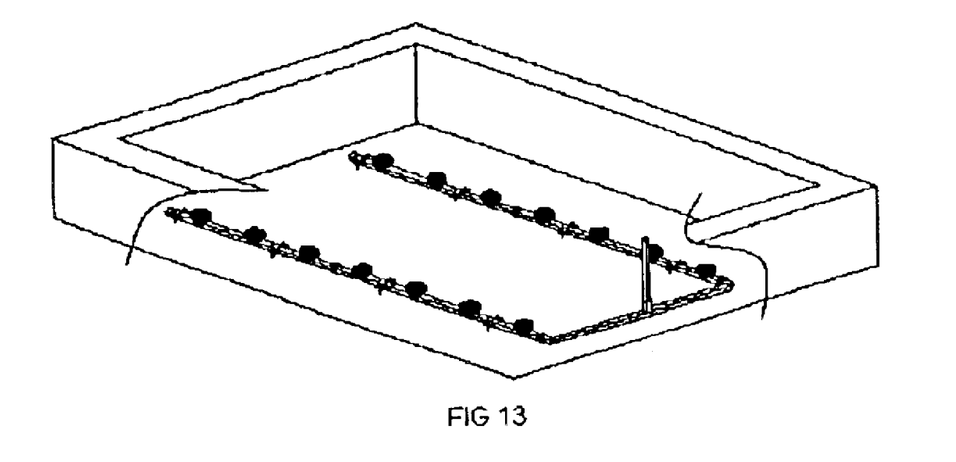
FIG. 13 is a three dimensional wide-angle view of Disc type Quick Connect Diffuser Assemblies installed on a piping grid in a basin.

The air diffusers 8 are preferably disc type with nominally 12" in useful membrane diameter with a perforated rubber, thermoplastic or thermoset membrane 9, integral O-ring seal 10, retaining ring FIG. 10, base plate FIG. 9, threaded nipple 12, and air orifice 13, however disc diffusers may be any diameter from 2" to 30". Materials of construction of retaining ring 11 and base plate FIG. 9 are preferably polypropylene, however they may be any plastic material, including polyvinyl chloride, ABS or other. The air diffuser as shown in FIG. 1. is a disc type, which is the preferred type of diffuser to use with the special saddle FIG. 2, however the invention also relates to the use of the upper saddle 16 and a mating male section on a tubular type diffuser to connect tubular type diffusers FIG. 12 to header pipes 3, as well.

The invention can be quickly and easily installed on air headers 3 in basins. The two saddle sections 2 and 16 are applied to the opposite sides of the air header 3. The special wedge fastener 1 is applied to integrally molded flanges on both upper saddle 16 and lower saddle 2. Due to the tapered configuration of the molded flanges and special wedge fastener 1, the final connection is a secure clamp.

Figure 14:
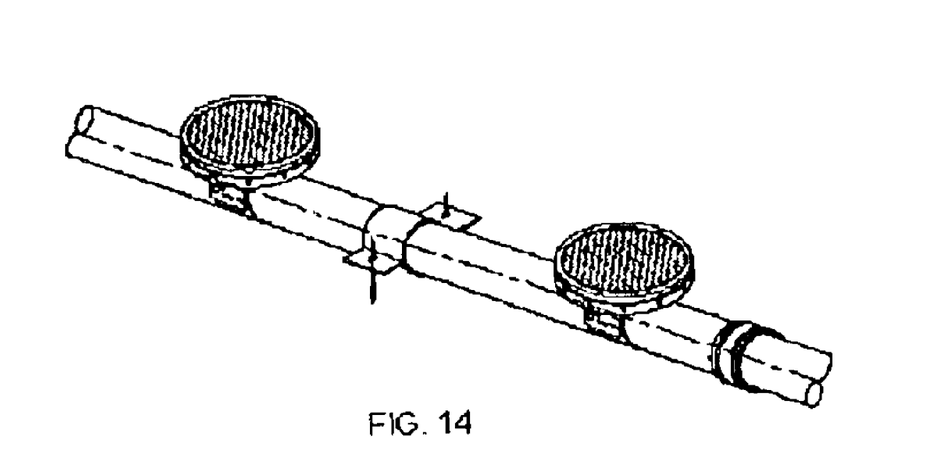
FIG. 14 is three dimensional close-up view of Disc type Quick Connect Diffuser Assemblies installed on a piping grid in a basin.

The Saddle assembly includes two gasket channels and an O-ring channel on the inside of both saddle clamps FIG. 14. The gaskets and O-ring are sized according to the pipe outside diameter. This enables a single saddle model to be installed on multiple sizes of pipe, and is particularly applicable to Metric and US dimension pipes. US nominal 4" pipe is 114.3 mm in outside diameter, whereas Metric 4" pipe is 110.0 mm in outside diameter. The adaptability of this feature is not limited only to attachment of saddle assemblies to 4" nominal pipe.

Air Diffusers 8 can then be attached to the upper saddle section 16 by holding the air diffuser 8 in 2 hands, applying it to the upper saddle 16 properly positioned and rotating clockwise or counterclockwise. The male 6 and female 7 bayonet assembly is tapered to securely clamp the parts together. The rapid speed of installation is an important advantage of the invention.

By virtue of the construction of the present invention, when membranes 9 need to be replaced or removed from the air diffuser 8 for regular maintenance, a spanner wrench may be directly applied to the retaining ring FIG. 10 without necessitating the removal of the complete diffuser from the saddle FIG. 2 as was necessary with previous diffuser mounting arrangements.

The mounted assembly consisting of an air diffuser 8 and a saddle FIG. 2 can resist significant forces and vibration applied on it by flowing water from mechanical mixers or influent and effluent streams in the basin. This is a distinct advantage over glued or threaded connections which offer much less resistance to such forces, and particularly so in cold climates where plastic materials such as PVC or ABS may become brittle, or in hot climates where plastic materials such as PVC can melt.

From the foregoing it will be seen that this invention is one well adapted to attain all ends and objectives hereinabove set forth with the other advantages which are obvious and which are inherent to the structure.

It will be understood that certain features and sub combinations are of utility and may be employed without reference to other features and sub combinations. This is contemplated by and is within the scope of the claims.

Since many possible embodiments may be made of the invention without departing from the scope thereof, it is to be understood that all manner herein set forth or shown in the accompanying drawings is to be interpreted as illustrative, and not in a limiting sense. Consequently, variances and modifications commensurate with the above teachings, and the skill or knowledge of the relevant art, are within the scope of the present invention.

What is claimed is:

1. A diffuser assembly for application to an aeration pipe having an outlet port adapted for immersion in liquid with a longitudinal axis of pipe oriented on a common horizontal plane, said diffuser assembly comprising: two saddle sections applicable to said pipe and adapted to be secured on the pipe to extend closely and substantially fully around the pipe; a bayonet type outlet fitting extending from the saddle assembly to receive air from an air distribution header containing pressurized gas when sections are secured on the pipe; a diffuser body with a bayonet fitting which forms a common leak-free assembly with the saddle when installed together.

2. A saddle assembly as set forth in claim 1, wherein a single bayonet type outlet fitting of the saddle is located on the top vertical axis of the saddle for use with disc diffusers.

3. A diffuser assembly as set forth in claim 2, wherein each diffuser includes a bayonet fitting which mates to the upper saddle section forming a leak free seal resistant to vibration and force.

4. A saddle assembly as set forth in claim 1, wherein the saddle sections are adjustable for mounting on air distribution header pipes with US or Metric outside dimensions, such as but not limited to 110 mm metric and 114.3 mm US.

5. A saddle assembly as set forth in claim 4, wherein two gaskets and a single O-ring of varying thickness are applied to the inside of the two saddle sections to adapt a saddle assembly to be secured onto either metric or US dimension pipe.

6. A saddle assembly as set forth in claim 1, wherein the saddle need not be removed from the pipe in order to quickly remove the diffuser assembly.

7. A system for aerating waste water comprising: an air distribution header pipe, a plurality of diffuser assemblies adapted to diffuse air received from the said distribution pipe into the waste water, each of the said diffuser assemblies is mounted along the air distribution header-pipe and includes, a saddle assembly with bayonet connection communication with the said distribution pipe; a disc diffuser assembly with bayonet connection connected to the said saddle assembly.

* * * * *